United States Patent
Heath

(10) Patent No.: US 8,448,969 B2
(45) Date of Patent: May 28, 2013

(54) EXERCISE VEHICLE WITH ROD STEERING SYSTEM

(76) Inventor: Steven Coe Heath, Vancouver, WA (US)

( * ) Notice: Subject to any disclaimer, the term of this patent is extended or adjusted under 35 U.S.C. 154(b) by 190 days.

(21) Appl. No.: 12/912,466

(22) Filed: Oct. 26, 2010

(65) Prior Publication Data

US 2011/0095505 A1    Apr. 28, 2011

Related U.S. Application Data

(60) Provisional application No. 61/279,924, filed on Oct. 28, 2009.

(51) Int. Cl.
  *B62D 1/12* (2006.01)
  *B62M 1/04* (2006.01)
  *B62M 1/12* (2006.01)

(52) U.S. Cl.
  USPC ............................ 280/234; 280/240; 280/270

(58) Field of Classification Search
  USPC .... 280/233, 234, 240, 270, 244, 247; 74/496, 74/561
  See application file for complete search history.

(56) References Cited

U.S. PATENT DOCUMENTS

| | | | | |
|---|---|---|---|---|
| 215,876 A | * | 5/1879 | Browne | 280/234 |
| 281,489 A | * | 7/1883 | Girard | 280/235 |
| 1,105,216 A | * | 7/1914 | Smith | 280/240 |
| 4,541,647 A | * | 9/1985 | Braun | 280/234 |
| 4,674,762 A | | 6/1987 | Nelson et al. | |
| 5,280,936 A | | 1/1994 | Schmidlin | |
| 5,775,708 A | | 7/1998 | Heath | |
| 7,223,210 B2 | * | 5/2007 | Krul et al. | 482/57 |
| 2011/0233885 A1 | * | 9/2011 | McMillan | 280/89.11 |

* cited by examiner

*Primary Examiner* — Anne Marie M Boehler
(74) *Attorney, Agent, or Firm* — Rylander & Associates, PC; Philip R. M. Hunt; Kurt M. Rylander

(57) ABSTRACT

An exercise vehicle is provided with an improved push/pull rod steering system for use in directing vehicle travel and maintaining balance without interfering significantly with vehicle power. The vehicle includes a frame with an attached drive system that includes a drive wheel. The drive system includes arm levers operatively connected to the drive wheel so that counter-reciprocal movement of the arm levers produces rotation of the drive wheel. The steering system includes a guidance wheel rotatively coupled with the frame, a steering crank which is operatively coupled with the guidance wheel, hand levers pivotally attached to the arm levers and push/pull rod assemblies connecting the hand levers to the steering crank. When one hand lever pivots, the steering crank rotates, causing the guidance wheel to turn while simultaneously causing the other hand lever to pivot the opposite direction.

25 Claims, 12 Drawing Sheets

EXERCISE VEHICLE WITH ROD STEERING SYSTEM

CROSS-REFERENCED TO RELATED APPLICATIONS

This application claims benefit of U.S. Provisional Application 61/279,924, filed Oct. 28, 2009.

FIELD OF THE INVENTION

Embodiments of the invention disclosed herein relate generally to exercise vehicles, and more particularly, to a steering system for use in a vehicle which is propelled at least partially by action of a rider's arms.

BACKGROUND

One advantage offered by "human-powered" vehicles is that such vehicles provide exercise for the rider, improving health and fitness. Other activities, such as running and jogging, also provide exercise, but are difficult on the back, legs, feet, and joints. Cycling avoids the jarring effect of running or jogging, but requires high speeds or long distances to achieve truly beneficial aerobic exercise. None of these activities provide meaningful upper body exercise. What is needed is a vehicle which provides aerobic benefit even at low speeds, and which provides the rider with an upper body workout. This may be accomplished by using simultaneous arm and leg movements to propel the vehicle.

Although some vehicles are known to utilize both the arms and legs to produce propulsion, these vehicles tend to utilize the power of the human body in an inefficient manner. Power typically is applied only in surges, and when such power is applied, the muscles are active in only one direction. One example of such a vehicle is U.S. Pat. No. 5,280,936 to Schmidlin. This vehicle has a complex and expensive arrangement of chains, rollers, and sprockets.

One problem which is common to human-powered vehicles which employ both the arms and legs to propel the vehicle relates to steering, an operation which may be complicated by the use of the rider's arms for propulsion. Presently known art attempts to address this problem, but has not completely solved the problem. For example, U.S. Pat. No. 5,775,708 to Heath discloses an "Exercise Vehicle with Cable Steering System." This vehicle discloses arm levers that moved back-and-forth to aid propulsion and a push/pull cable steering system with actuating hand cranks on the arm levers. However, this cable steering system requires expensive cables which would eventually need to be replaced. Additionally, the steering cable would bend, developing friction that would require additional force to overcome. Also, when bent, there is slack in the cables, requiring extra movement in one end of the steering system before the other end moves.

The following represents a list of known related art:

| Reference: | Issued to: | Date of Issue/Publication: |
|---|---|---|
| U.S. Pat. No. 4,674,762 | Nelson et al. | Jun. 23, 1987 |
| U.S. Pat. No. 5,280,936 | Schmidlin. | Jan. 25, 1994 |
| U.S. Pat. No. 5,775,708 | Heath | Jul. 7, 1998 |

The teachings of each of the above-listed citations (which does not itself incorporate essential material by reference) are herein incorporated by reference. None of the above inventions and patents, taken either singularly or in combination, is seen to describe the instant invention as claimed.

SUMMARY AND ADVANTAGES

Embodiments of the present invention solve the aforementioned problems by introduction of a human-powered exercise vehicle which employs a push/pull rod steering system. The exercise vehicle includes a frame, a drive system attached thereto, at least one drive wheel rotatively coupled with the frame to effect propulsion of the vehicle, and a steering system which is also attached to the frame. The exercise vehicle's drive system includes a pair of counter-reciprocal arm levers, which project generally upward from the frame within arm's reach of the rider. The arm levers transfer motion to the drive wheel, movement of the arm levers producing corresponding rotation of the drive wheel. The exercise vehicle also has pedals so that the rider may propel the vehicle with simultaneous arm and leg motions. In one embodiment of the invention, the arm levers are connected to pedal extensions. In another embodiment, the arm levers are connected to foot platforms instead of pedal extensions and the pedals are omitted.

The vehicle's steering system includes a pair of hand levers which are pivotally attached to the arm levers, each hand lever being grasped by one of the rider's hands. The hand levers, in turn, control a guidance wheel which is coupled with the vehicle's frame. The guidance wheel is configured both to roll on a surface and to rotate left or right to effect a change in the direction of vehicle travel. A steering crank is attached to the guidance wheel so that the wheel turns when the steering crank rotates around a vertical axis. Push/pull rod assemblies connect the steering crank to the hand levers. A rider thus may turn the vehicle right or left by pivoting one of the hand levers or both in the appropriate directions. When a hand lever rotates, the steering crank rotates, causing the other hand lever to correspondingly pivot. The rider thus is able to maintain full and effective power because the rider's arms remain in the same vertical plane, whether the vehicle is traveling through a turn, or in a straight line. For two wheeled vehicles where both steering and balancing are required, the invented hand and arm lever configuration provides the rider with vertical stability and control of the vehicle frame while enabling steering and propulsion movements. Any slack or play which could develop through wear in the parts between the hand levers and the steering crank is eliminated by the weight of the rider's hands and arms pushing downward equally on both hand levers and thus, through the rod assemblies, into the steering crank. Wear in the steering system is limited to parts which can easily and inexpensively be replaced from the local bicycle shop or hardware store.

Additional advantages of the present invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages will become apparent from consideration of the following detailed description given with reference to the accompanying drawings, which specify and show embodiments of the present invention.

BRIEF DESCRIPTION OF THE DRAWINGS

An embodiment of the present invention is illustrated by way of example and not limitation in the figures of the accompanying drawings, in which like references indicate similar elements and in which.

REFERENCE NUMBERS USED IN DRAWINGS

Figure 1:
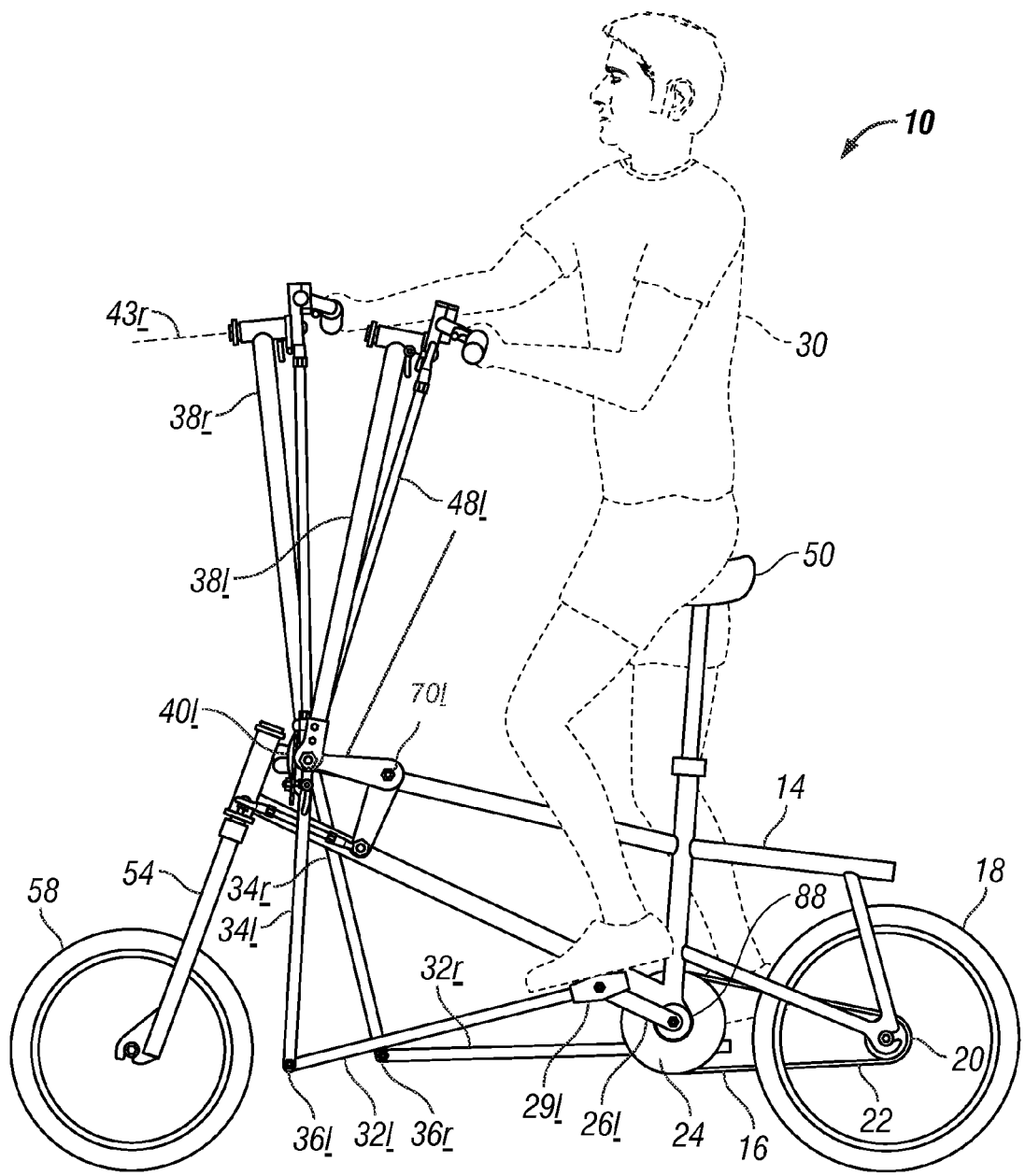
FIG. 1 is a side elevation view of an exercise vehicle, constructed in accordance with a first embodiment of the invention, a human rider being shown in phantom lines.

Turning now descriptively to the drawings, similar reference characters will denote similar elements throughout the several views. With regard to the reference numerals used, the following numbering is used throughout the various drawing figures:

| Part References | Reference Numbers |
| --- | --- |
| exercise vehicle | 10 |
| steering system | 12 |
| frame | 14 |
| drive system | 16 |
| drive wheel | 18 |
| transmission | 20 |
| chain | 22 |
| chain wheel | 24 |
| gear shifter | 25 |
| drive crank | 26 |
| brake lever | 27 |
| foot platform | 28 |
| pedal | 29 |
| rider | 30 |
| pedal extension | 32 |
| lower arm portion | 34 |
| lower plate | 35 |
| lower pivot | 36 |
| upper arm portion | 38 |
| upper plate | 39 |
| connecting plate assembly | 40 |
| center pivot axis | 42 |
| hand lever axis | 43 |
| hand lever | 44 |
| arm lever | 45 |
| hand lever crank | 46 |
| binder bolt | 47 |
| push/pull rod assembly | 48 |
| seat | 50 |
| steering crank | 52 |
| front fork | 54 |
| guidance wheel | 58 |
| rider's hand | 60 |
| horizontal plane | 61 |
| vertical plane | 62 |
| shoulder | 64 |
| vertical rod | 66 |
| bell crank | 67 |
| horizontal bell crank end | 68 |
| bell crank line | 69 |
| bell crank pivot | 70 |
| vertical bell crank end | 72 |
| horizontal rod | 74 |
| holding loop | 76 |
| flanged bushing | 78 |
| pivot support | 82 |
| connecting plate | 84 |
| quick release binder bolt | 86 |
| bottom bracket shell | 88 |
| cross plate | 101 |
| frame anchor | 102 |
| center pivot pin | 104 |
| steering axis | 110 |
| lower vertical rod end | 112 |

DETAILED DESCRIPTION

When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

One or more embodiments of the present invention are described herein. In the following description, for purposes of explanation, numerous specific details are set forth in order to provide a thorough understanding of these embodiments. It will be evident to one skilled in the art that the present invention may be practiced without some of these details. On the other hand, to avoid obscuring the invention, in describing some embodiments, certain details necessary for a functioning device are not shown, but one skilled in the art would understand these necessary details are present.

Reference to "one embodiment" or "an embodiment" in the description of a particular feature, structure, or characteristic means that the particular feature, structure, or characteristic described is included in at least one embodiment of the invention. The appearances of the phrase "in one embodiment" in various places in the specification are not necessarily all referring to the same embodiment.

It will, of course, be appreciated that in the development of any actual implementation of this invention, numerous implementation-specific decisions must be made in order to achieve a developer's specific goals, such as compliance with application and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In describing the various embodiments, directional terms are used, such as left, right, up, down, upward, downward, front, rear, forward, rearward, etc. These directional terms are based on a human rider's frame of reference and presumes a direction of travel of the vehicle in the direction the rider faces. The reference designators for matching elements of the vehicle include letters to indicate the side of the vehicle to which it is attached. The letter "l" indicates the left side and the letter "r" indicates the right side. "Down" and "downward" mean generally toward the surface on which the vehicle travels and "up" and "upward" mean generally away from the surface on which the vehicle travels. "Forward" and "front" mean generally the direction in which the rider faces and "rearward" and "rear" are generally the opposite thereof. Also "turning the vehicle" means changing the direction of travel of the vehicle to the right or left.

Figure 2:
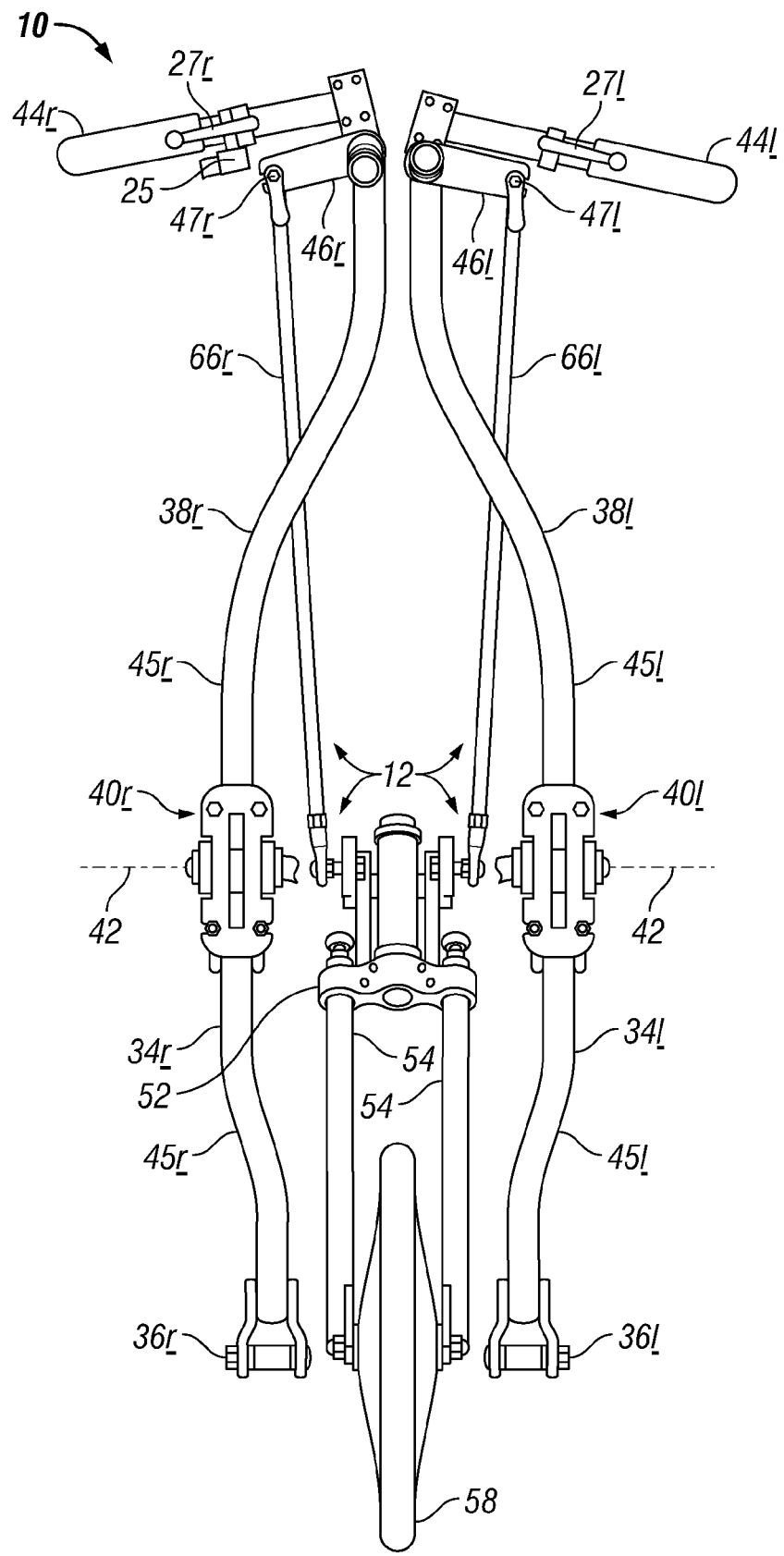
FIG. 2 is a front elevation view of the exercise vehicle of FIG. 1 with the center pivot pin removed for clarity.
Figure 3:
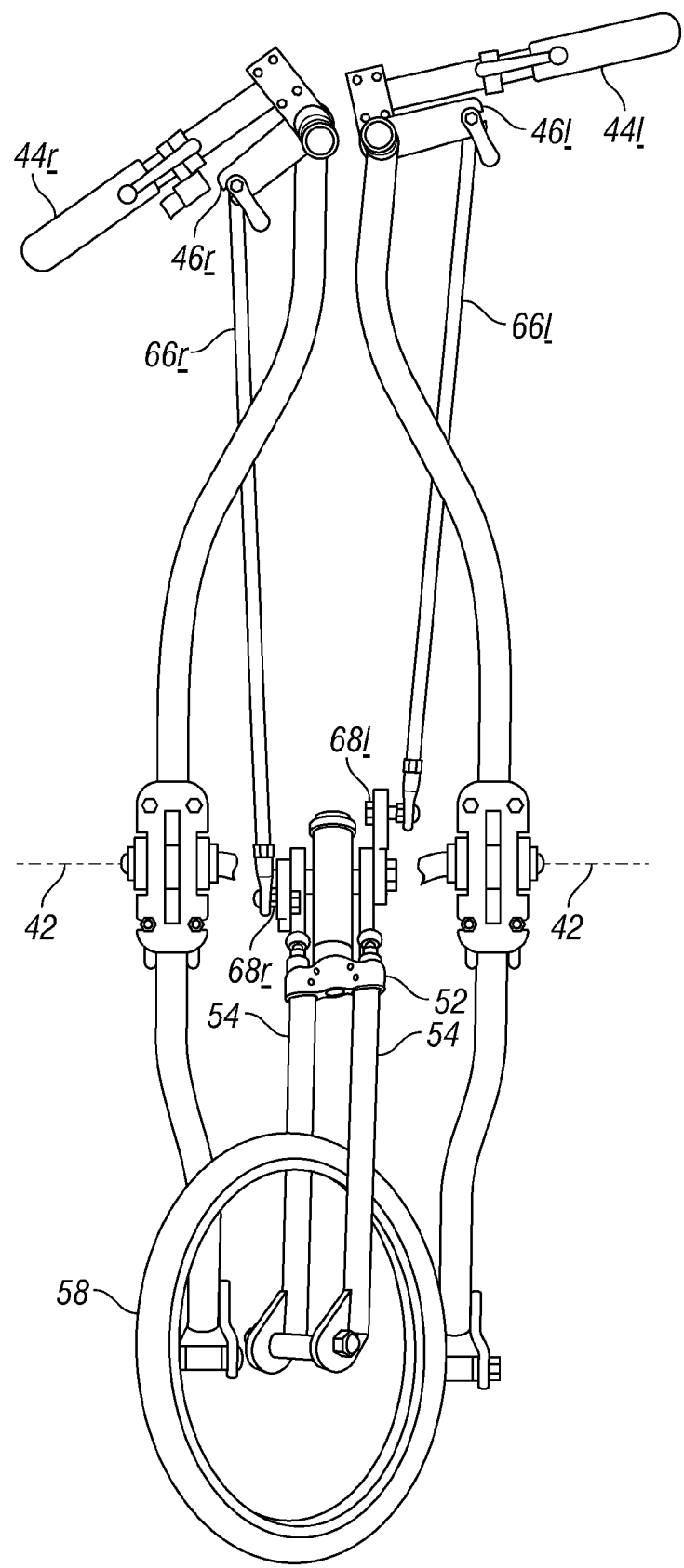
FIG. 3 is a front elevation view of the exercise vehicle of FIG. 1 shown in a turn and with the center pivot pin removed for clarity.
Figure 4:
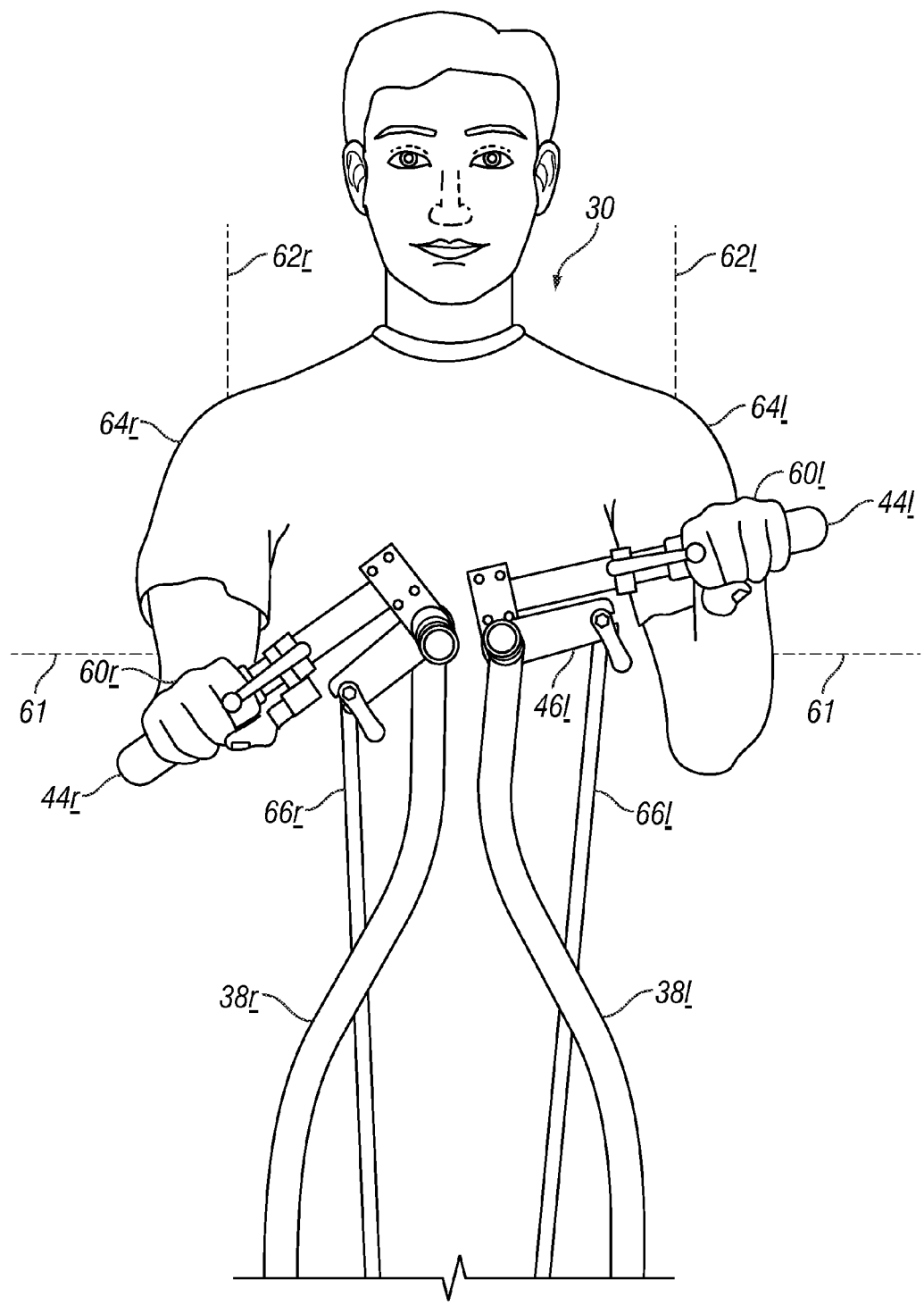
FIG. 4 is a simplified, fragmentary front elevation view of the exercise vehicle of FIG. 1 which shows the hand levers and the rider's upper body during a turn.
Figure 5:
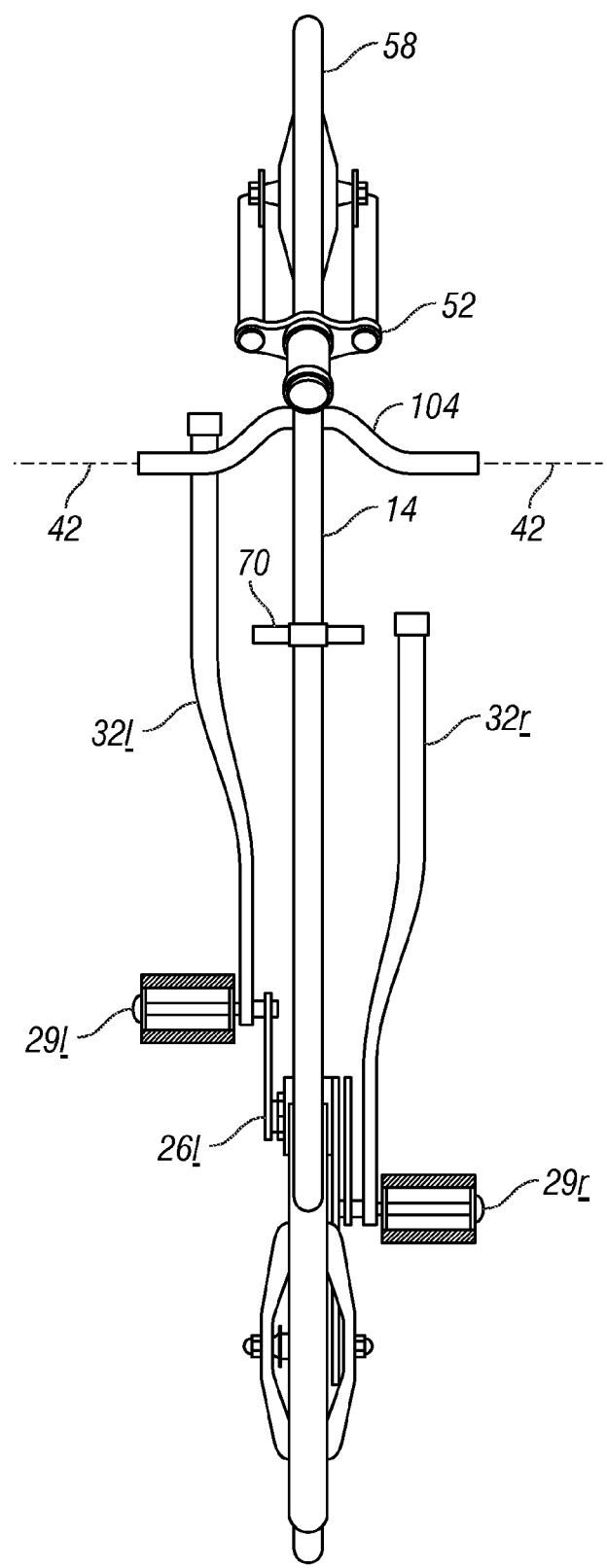
FIG. 5 is a top view of the exercise vehicle of FIG. 1 with the arm levers and other parts removed for clarity.
Figure 6:
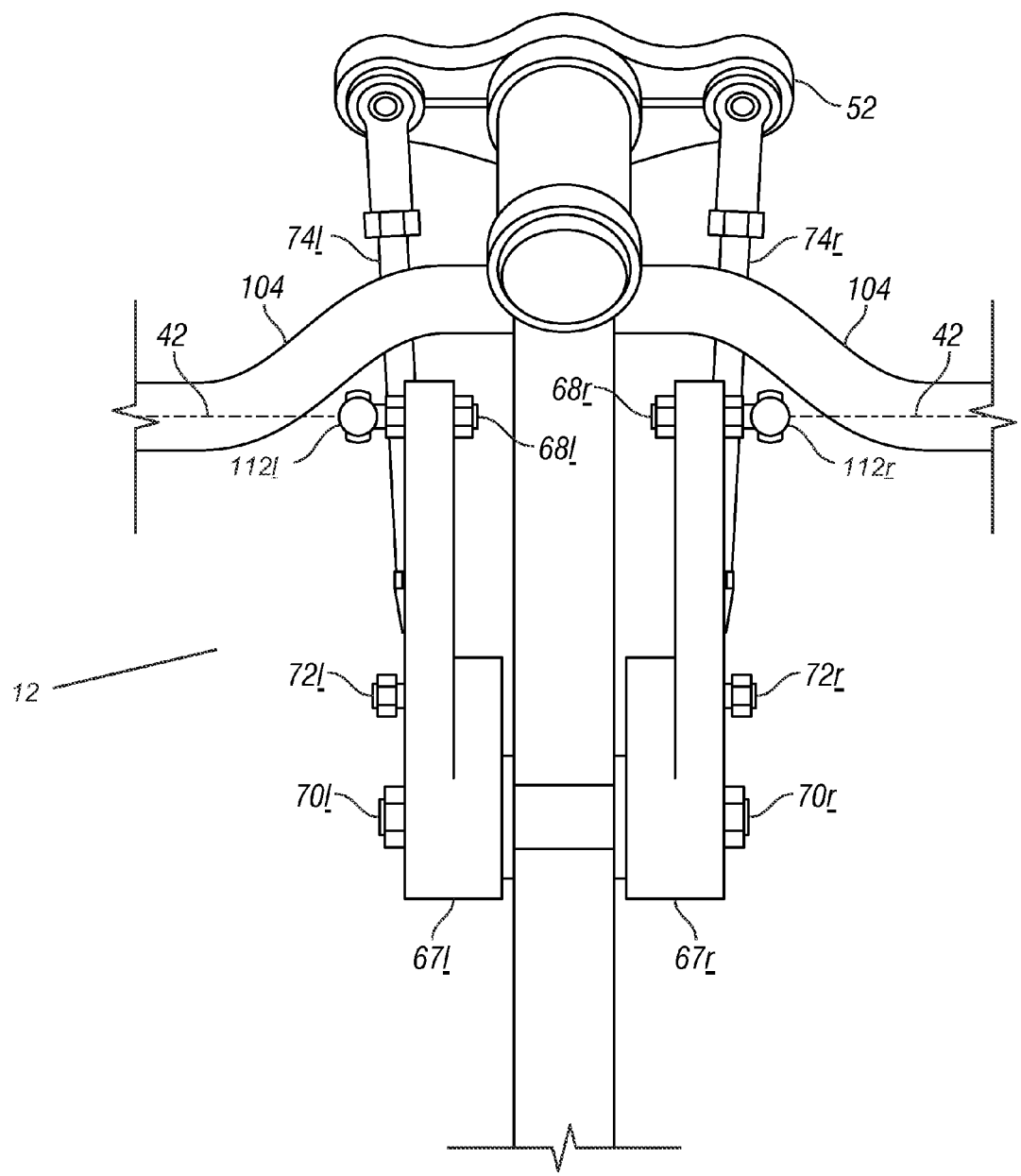
FIG. 6 is a fragmentary, top plan view of the front end of the exercise vehicle of FIG. 1 with the arm levers and other parts removed for clarity.

A first embodiment of an exercise vehicle 10 is shown in FIGS. 1-7. As shown in FIGS. 1, 2, and 5, the exercise vehicle 10 includes a frame 14, a steering system 12, right and left arm levers 45r, 45l and a drive system 16. Drive system 16 includes drive wheel 18 which is rotatively connected to the rear portion of the frame 14, and employs the following components which are similar to those on a conventional bicycle: a multi-geared transmission 20, a chain 22, a chain wheel 24, right and left drive cranks 26r and 26l, right and left pedals 29r, 29l, gear shifter 25 and right and left brake levers 27r, 27l. The right and left drive cranks 26r, 26l are rotatively mounted to the lower portion of the frame 14 at bottom bracket shell 88. Unlike a conventional bicycle, however, the depicted exercise vehicle 10 has pedal extensions 32r, 32l pivotally connected on their rearward end to the pedals 29r, 29l. The right and left pedal extensions 32r, 32l protrude forwardly from the respective right and left pedals 29r, 29l. The right and left pedal extensions 32r, 32l are pivotally connected on their forward end to lower arm portions 34r, 34l respectively of the arm levers 45r, 45l.

A rider 30 is shown in phantom lines in FIG. 1 seated on a seat 50 with the rider's feet on the pedals 29r, 29l. The rider 30 propels the exercise vehicle 10 using the pedals 29r, 29l and the arm levers 45r, 45l.

The drive system 16 is configured to operate in a drive mode, conveying rotational force from the drive cranks 26r, 26l to the drive wheel 18 via the chain wheel 24, chain 22, and multi-geared transmission 20. When the rider is thus propelling the exercise vehicle 10, the pedals 29 move in an elliptical or circular fashion and the arm levers 45r, 45l move in a back-and-forth reciprocating fashion. The drive system 16 is configured to also operate in a free wheel mode as well, with the drive wheel 18 rotating while the chain 22, chain wheel 24, drive cranks 26 and arm levers 45r, 45l remain stationary relative to the frame 14.

The forward ends of the pedal extensions 32r, 32l are pivotally attached to the respective right and left lower arm portions 34r, 34l at attach points depicted by right and left lower pivots 36r, 36l. The two arm levers 45r, 45l are formed from a rigid connection of upper arm portions 38r, 38l to corresponding lower arm portions 34r, 34l by connecting plate assemblies 40r, 40l at a center pivot axis 42. The lower arm portions 34r, 34l have pivot supports 82r, 82l at their upper ends (shown in FIG. 10). The pivot supports 82r, 82l, together with flanged bushings 78, are penetrated by a center pivot pin 104 which is shaped so that the arm levers 45r, 45l pivot on a center pivot axis 42.

A pair of hand levers 44r, 44l (i.e., handles) are pivotally attached to the upper end of each of the arm levers 45r, 45l. In some embodiments, the hand levers 44r, 44l are covered with a cushioning material (such as foam rubber, plastic or leather) to facilitate the rider's grip. To assist in propelling the exercise vehicle 10, the rider 30 grasps each of the hand levers 44r, 44l and simultaneously moves the arm levers 45r, 45l back and forth in the opposite directions from one another (i.e., in a counter-reciprocal fashion).

The reader's attention now is directed to steering system 12, which is shown in FIGS. 1,2,3,6 and 7. As indicated, the steering system 12 includes the hand levers 44r, 44l which are pivotally attached to the tops of the corresponding upper arm portions 38r, 38l, each of the hand levers 44r, 44l being configured to pivot up or down about a corresponding hand lever axis 43r, 43l (see FIG. 1). Each of the hand lever axes 43r, 43l is normal to a longitudinal axis of its corresponding upper arm portion 38r, 38l. The hand levers 44r, 44l include hand lever cranks 46r, 46l rigidly connected to the hand levers 44r, 44l that pivot about the same hand lever axes 43r, 43l respectively. When a hand lever 44 pivots up, its corresponding hand lever crank 46 pivots up, and vice versa. When a hand lever 44 pivots down, its corresponding hand lever crank 46 pivots down, and vice versa.

The rider 30 initiates a change in the direction of the exercise vehicle 10 travel by pivoting one of the hand levers 44r, 44l up or down. This action causes the connected hand lever crank 46 to pivot in the same direction. This force is propagated further by push/pull rod assemblies 48r, 48l which transmit force between the hand lever cranks 46r, 46l and a steering crank 52. In some embodiments, the hand lever cranks 46r, 46l are omitted and the hand levers 44r, 44l transmit force directly to the push/pull rod assemblies 48r, 48l respectively.

Figure 7:
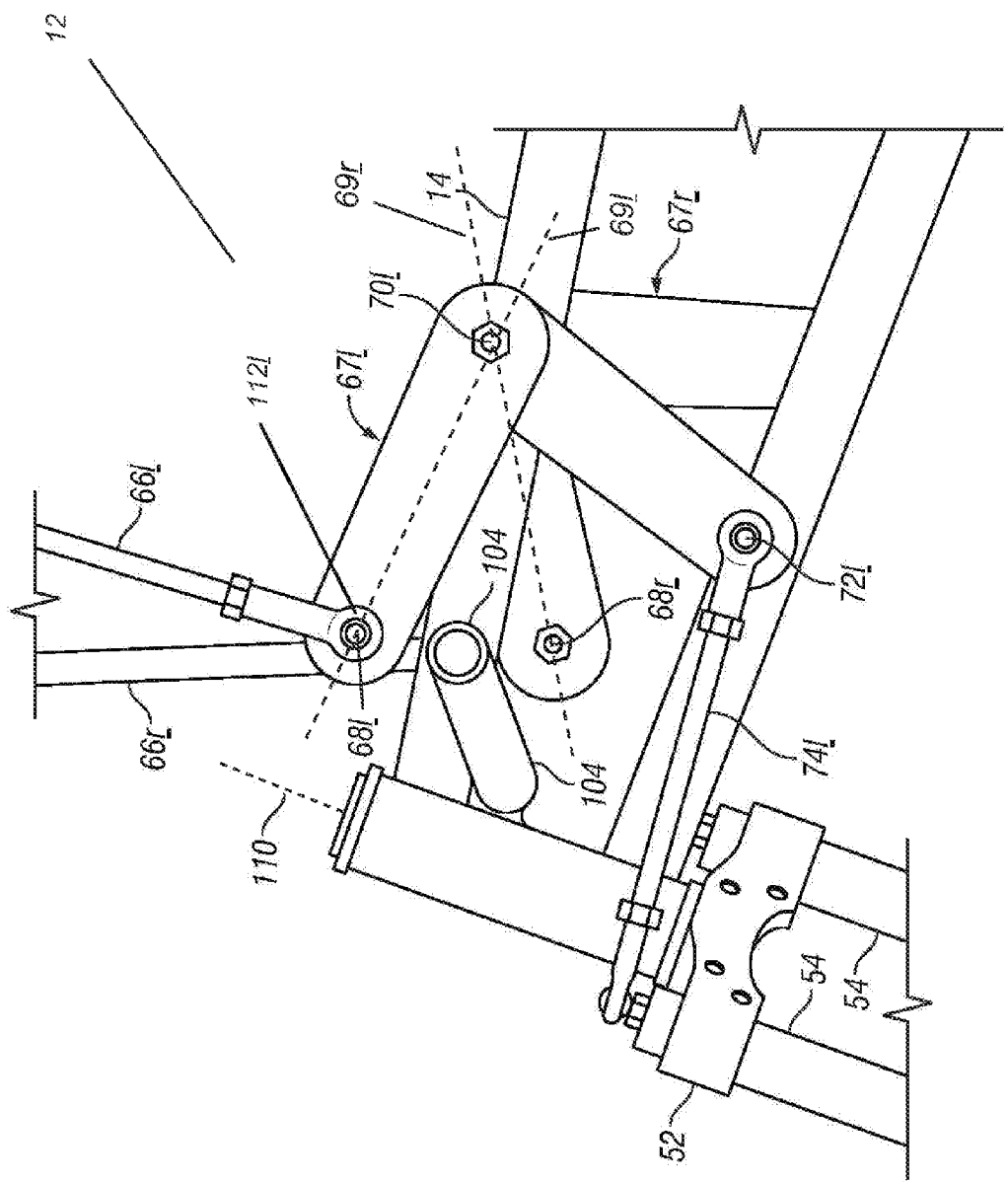
FIG. 7 is a fragmentary, side plan view of the front end of the exercise vehicle of FIG. 1 shown in a turn. The arm levers are removed for clarity.

The steering crank 52 rotates about a steering axis 110 that is generally vertical (shown in FIG. 7). The steering crank 52 is located at an upper end of front fork 54. A guidance wheel 58 is rotatively coupled to the front fork 54. When the steering crank 52 rotates left or right, the front fork 54 and guidance wheel 58 turn in the same direction, thereby changing the direction of travel of the exercise vehicle 10.

In the embodiment shown in FIG. 7, the push/pull rod assemblies 48r, 48l include vertical rods 66r, 66l, bell cranks 67r, 67l, and horizontal rods 74r, 74l. The bell cranks 67r, 67l are "L" shaped with horizontal and vertical arms rigidly connected (see FIG. 6). The bell cranks 67r and 67l are pivotally coupled to the frame 14 through bell crank pivots 70r, 70l. The bell cranks 67r, 67l have horizontal bell crank ends 68r, 68l and vertical bell crank ends 72r, 72l. The vertical rods 66r, 66l have lower vertical rod ends 112r, 112l, which are pivotally coupled with horizontal bell crank ends 68r, 68l respectively. The horizontal rods 74r, 74l are pivotally connected at their rearward ends to vertical bell crank ends 72r, 72l and pivotally connected at the forward ends to the steering crank 52. Pushing and/or pulling force from the hand levers 44r, 44l is communicated first via the vertical rods 66r, 66l which are pivotally attached at their upper ends to the hand lever cranks 46r, 46l respectively. When one horizontal bell crank end 68 moves up, the other moves down and vice versa. The bell cranks 67r, 67l pivot on the bell crank pivots 70r, 70l which move vertical bell crank ends 72r, 72l forward or rearward. When one vertical bell crank end 72 moves forward, the other moves rearward and vice versa. The push/pull rod assemblies 48r, 48l are configured so that when bell cranks 67r, 67l are pivoting on the bell crank pivots 70r, 70l, the lower vertical rod ends 112r, 112l pass at least near the center pivot axis 42. In the embodiment shown in FIG. 7, the lower vertical rod ends 112r, 112l pass not just near, but through the center pivot axis 42.

Configuring push/pull rod assemblies 48r, 48l so the lower vertical rod ends 112r, 112l pass through the center pivot axis 42 will minimize uncommanded steer. However, in other embodiments, the lower vertical rod ends 112r, 112l do not pass through the center pivot axis 42, but pass near enough that uncommanded steer is kept to a negligible level. The center pivot pin 104 is shaped and attached to the frame 14 in such a manner (shown in FIG. 6) as to allow the lower vertical rod ends 112r, 112l to pass without interference through or near the center pivot axis 42.

An alternative way to describe the interaction of the components shown in FIG. 7 is to imagine a right bell crank line 69r defined as a line running through the right bell crank pivot 70r and the right lower vertical rod end 112r (not shown in FIG. 7), and a left bell crank line 69l defined as a line running through the left bell crank pivot 70l and the left lower vertical rod end 112l. The push/pull rod assemblies 48r, 48l are configured so that the bell crank lines 69r, 69l intersect the center pivot axis 42 (not shown in FIG. 7) when the push/pull rod assemblies 48r, 48l are in a neutral, straight steering position. In a right turn steering position, as shown in FIG. 7, the left bell crank line 69l forward of the left bell crank pivot 70l passes above the center pivot axis 42 and the right bell crank line 69r forward of the right bell crank pivot 70r passes below the center pivot axis 42. In a left turn steering position, the left bell crank line 69l forward of the left bell crank pivot 70l passes below the center pivot axis 42 and the right bell crank line 69r forward of the right bell crank pivot 70r passes above the center pivot axis 42. When switching from the left turn steering position to the right turn steering position, the bell crank lines 69r, 69l pass through the center pivot axis 42.

In the embodiment shown in FIG. 7, the bell crank pivots 70r, 70l are simple pivots such that the horizontal bell crank ends 68r, 68l move in arcs around the bell crank pivots 70r, 70l, with the arcs passing at least near through the center pivot axis 42. In other embodiments (not shown), the bell crank pivots 70r, 70l and/or pivots at the horizontal bell crank ends 68r, 68l are complex sliding pivots such that that the lower vertical rod ends 112r, 112l move in straight vertical lines passing at least near the center pivot axis 42.

In yet another embodiment (not shown), the bell cranks 67r, 67l, bell crank pivots 70r, 70l, the steering crank 52, and the horizontal rods 74r, 74l are all shifted lower than shown in FIG. 7, with the bell crank pivots 70r, 70l attaching to a lower part of the frame 14 and the steering crank 52 attaching to a top of a shorter front fork 54. In such embodiments, the right and left lower vertical rod ends 112r, 112l are pivotally coupled with the horizontal bell crank ends 68l, 68r through right and left extending rods respectively. The right and left lower vertical rod ends 112r, 112l are coupled with means for confining the right and left lower vertical rod ends 112r, 112l to vertical movement, means such as sleeves or brackets with slotted grooves. In such embodiments, the lower vertical rod ends 112r, 112l still pass at least near the center pivot axis 42 and when switching from the left turn steering position to the right turn steering position, the bell crank lines 69r, 69l still pass through the center pivot axis 42.

When the rider rotates hand lever 44r downward, push/pull rod assembly 48r will pull on a right side of the steering crank 52, causing steering crank 52 to rotate right about the steering axis 110. At the same time, a left side of the steering crank 52 pulls on push/pull rod assembly 48l, causing hand lever 44l to pivot upward. In FIG. 7, steering crank 52 is shown rotated to the right. When in this position, the guidance wheel 58 also is turned to the right (the guidance wheel is not shown in FIG. 7).

FIG. 2 shows the hand levers 44r, 44l generally horizontal and the guidance wheel 58 in a straight position. In FIG. 3, hand levers 44r, 44l are shown in an orientation which would produce a right-hand turn. The resulting right-hand turn of the guidance wheel 58 is also shown.

Although the upper arm portions 38r, 38l move back and forth, they are rigid in terms of their lateral connection to the frame 14. That is, if the upper arm portions 38r, 38l are moved to the left, the frame 14 is tilted to the left and vice versa. Although the hand levers 44r, 44l are pivotally attached to the upper arm portions 38r, 38l respectively and move generally up and down, they too are rigid in terms of their lateral connection to the frame 14. Through the hand levers 44r, 44l, the rider has the ability to keep the top ends of the upper arm portions 38r, 38l either from moving left or right (not allowing the frame to tilt left or right) or to move them left or right (causing the frame to tilt left or right) whichever is desired by the rider. Therefore, the rider 30 has a firm hold on the frame's vertical orientation even while the upper arm portions 38r, 38l are moving back and forth and simultaneously the hand levers 44r, 44l are moving up or down. This combined with stability provided by the seat 50 and combined with the rider's control of the guidance wheel 58 enables the rider 30 to maintain good balance while operating the exercise vehicle 10.

Using the steering system 12, the rider 30 may effectively steer the exercise vehicle 10 and keep his or her balance while maintaining efficient power produced by the counter-reciprocal action of the arm levers 45r, 45l. During this counter-reciprocal action each of the rider's arms is kept in or near respective vertical planes 62r, 62l which extend forward from corresponding shoulders 64r, 64l in the direction of travel. When this is accomplished, the rider's arms produce more power during counter-reciprocal action.

FIG. 4 shows the rider 30 performing a right-hand turn. Hand lever 44r pivots downwardly and hand lever 44l pivots upwardly. However, each of the rider's hands 60r, 60l (and the rider's arms) remain in or near the respective vertical planes 62r, 62l which extend in a direction of travel from the corresponding shoulders 64r, 64l. Similarly, because the hand lever axes 43r, 43l are independent, and generally in alignment with the rider's shoulders and arms, the rider's hands 60r, 60l will remain substantially near an optimal horizontal plane 61, even during a turn.

Figure 8:
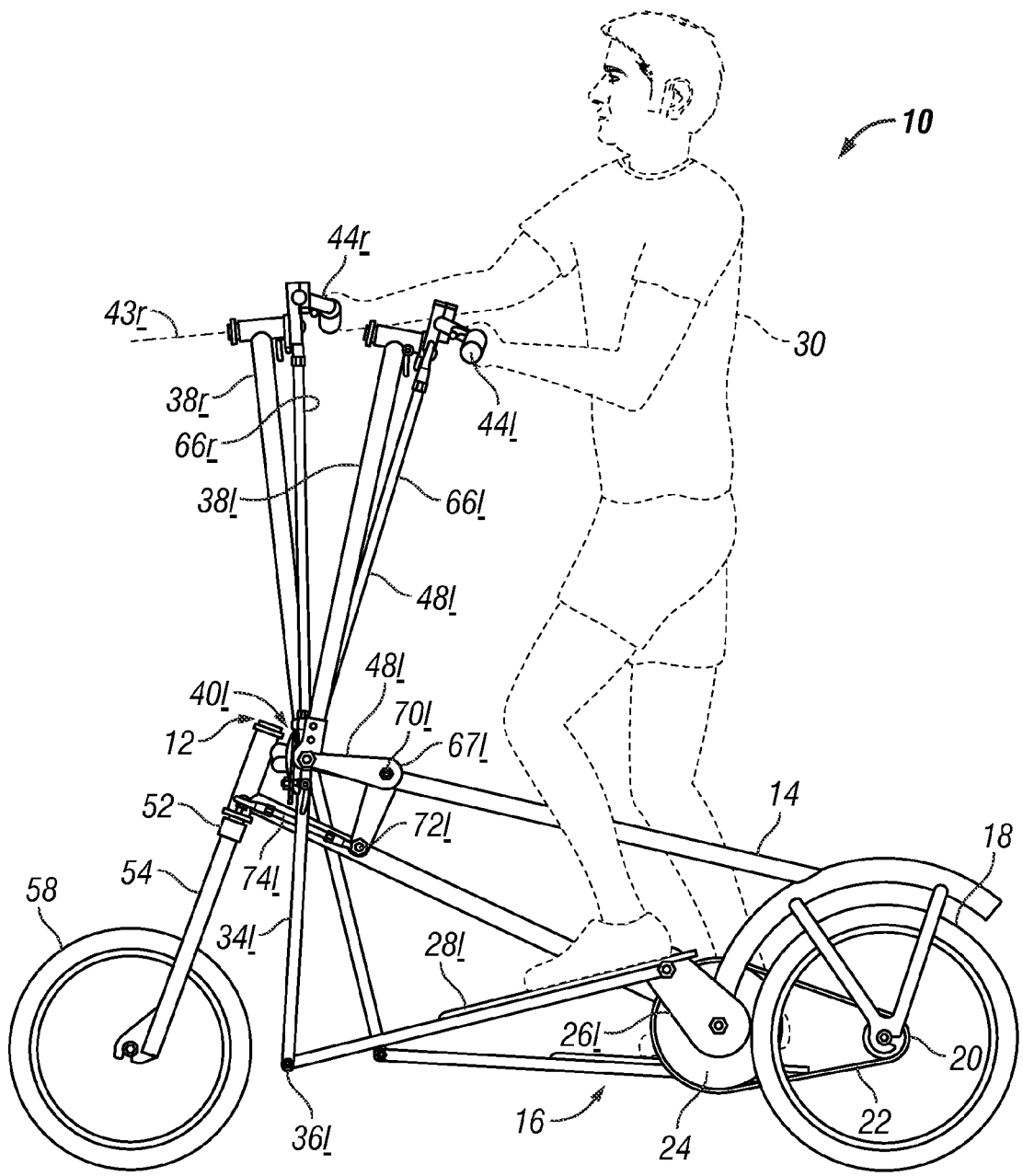
FIG. 8 is a side elevation view of the exercise vehicle, constructed in accordance with a second embodiment of the invention, with foot platforms instead of pedals and pedal extensions and without a seat.
Figure 9:
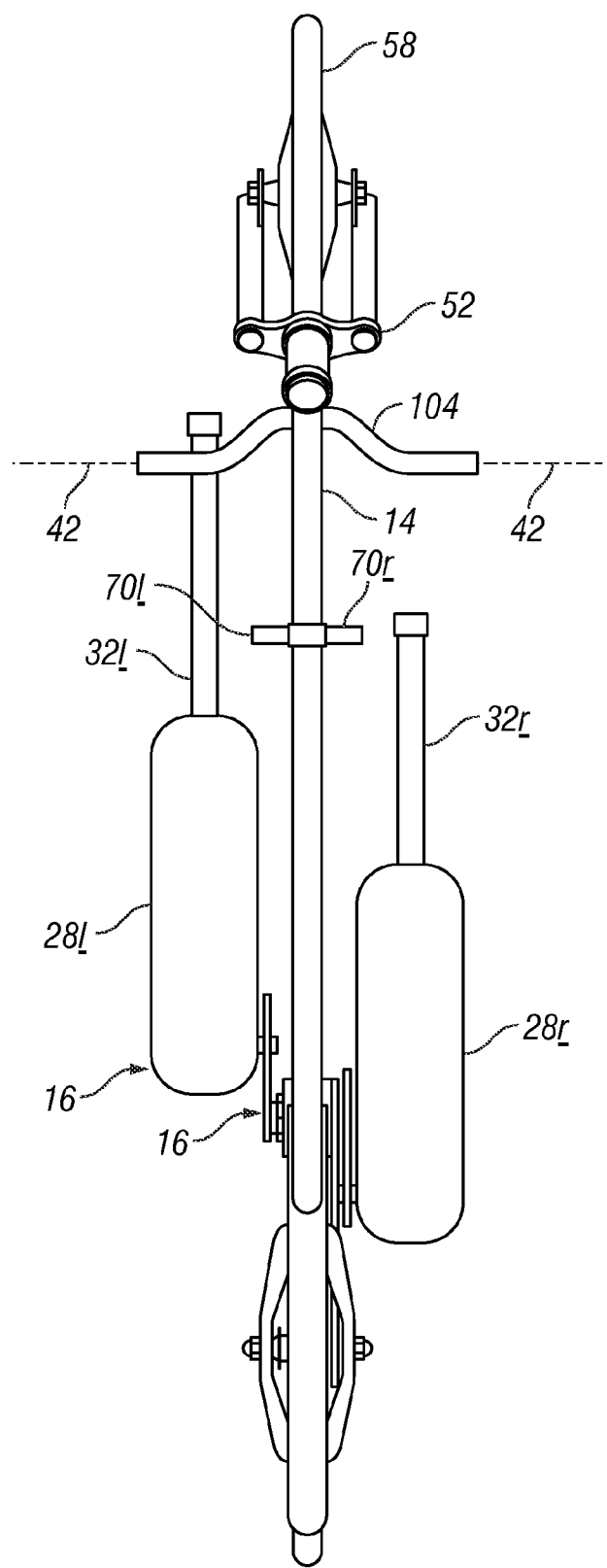
FIG. 9 is a top view of the exercise vehicle of FIG. 8 with the arm levers and other parts removed for clarity.

FIGS. 8 and 9 show a second embodiment, with foot platforms 28r, 28l alternatively used instead of pedals 29r, 29l and pedal extensions 32r, 32l. The foot platforms 28r, 28l support the feet of a standing rider and connect the drive cranks 26r, 26l to the lower arm portions 34r, 34l. In this embodiment, the exercise vehicle 10 does not have seat 50 and the rider 30 operates the exercise vehicle 10 in a standing position. In yet another embodiment (not shown), the exercise vehicle 10 has foot platforms 28r, 28l and a seat 50.

Figure 10:
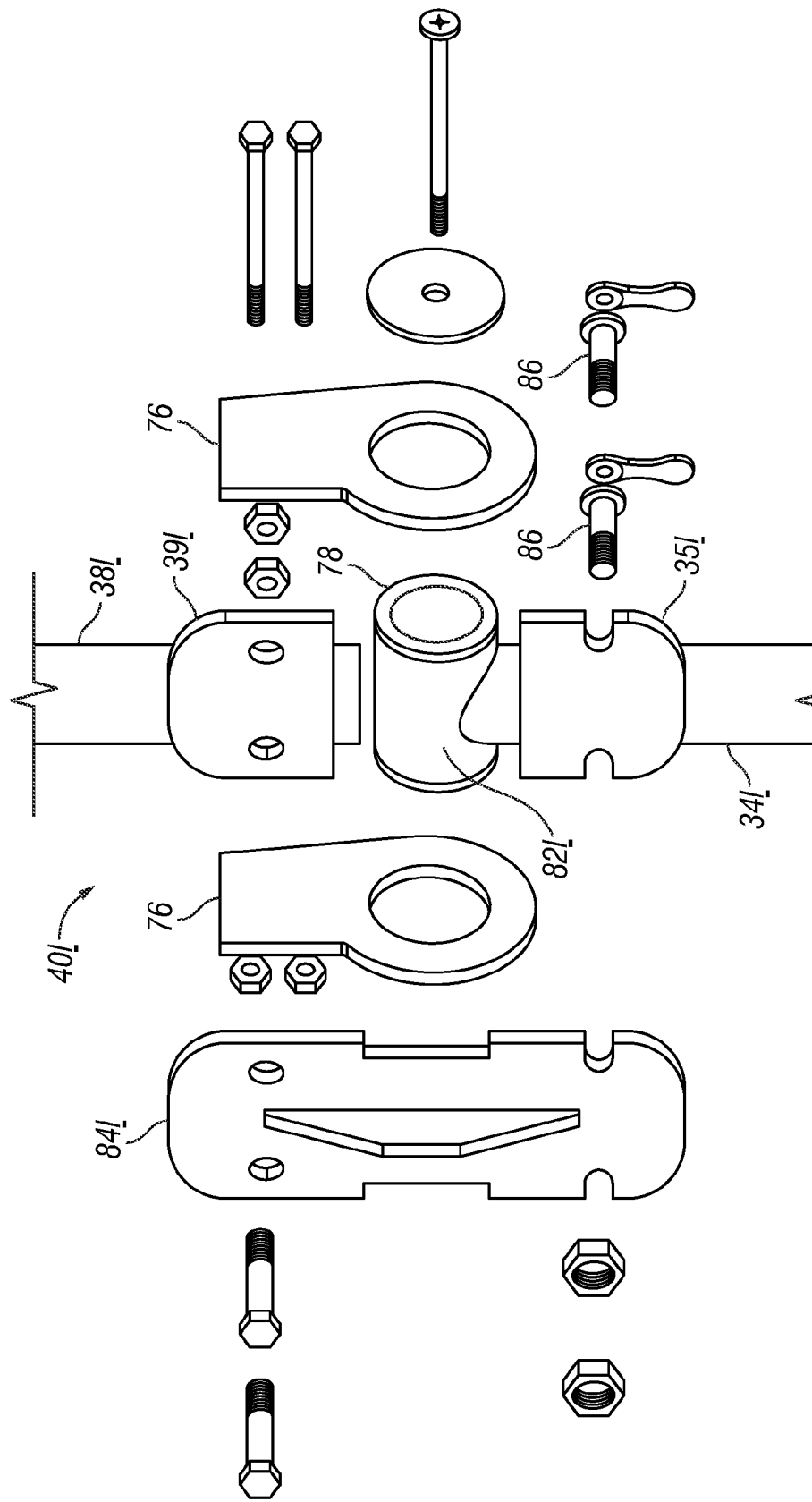
FIG. 10 is an exploded view of a mechanism for connecting the upper arm portions to the lower arm portions.
Figure 11:
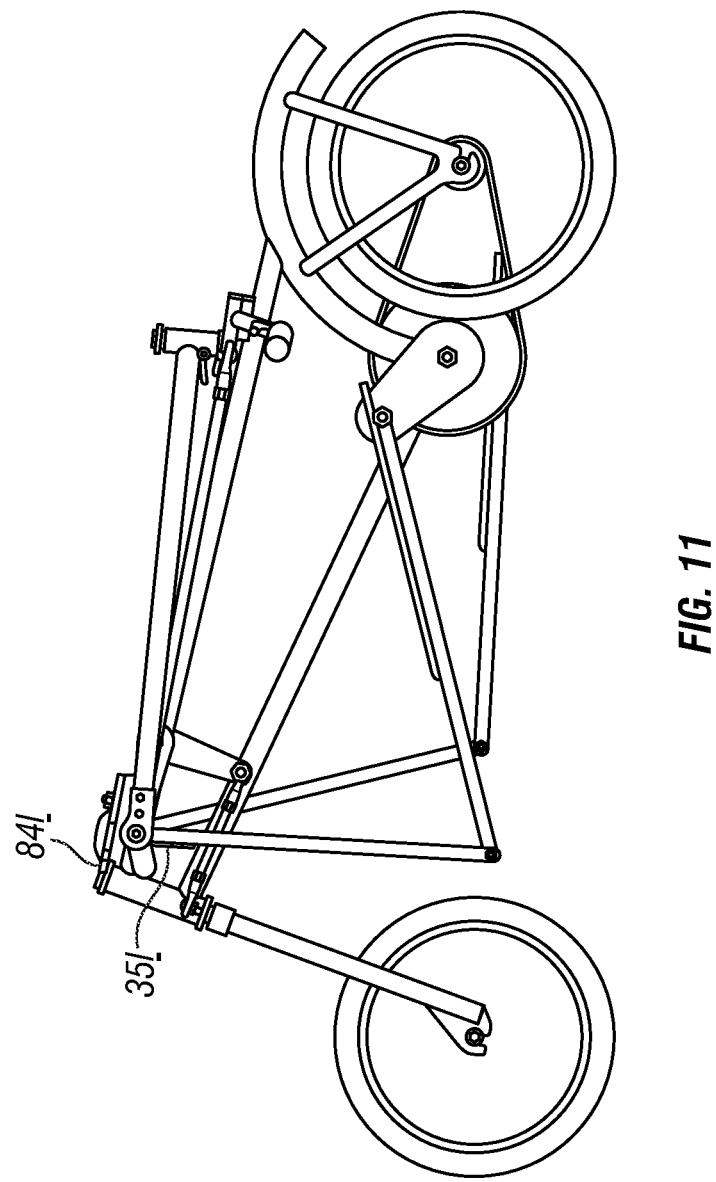
FIG. 11 is a side elevation view of the exercise vehicle with the upper arm portions folded back and down.

The reader's attention is now directed to connecting plate assembly 40l which is shown in FIG. 10. Upper arm portion 38l has upper plate 39l attached to it. Lower arm portion 34l has lower plate 35l attached to it. Two holding loops 76 snugly (but rotatively) fit around flanged bushings 78 and pivot support 82l and are bolted to the upper arm portion. Connecting plate 84l is bolted to the upper plate 39l and attached to the lower plate 35l with two quick release binder bolts 86 which fit in the two notches shown. This connecting plate assembly 40l allows the upper arm portion 38l to be quickly rotationally de-coupled from the lower arm portion 34l when the quick release binder bolts 86 are released and removed. The upper arm portion 38l can then be rotated back and down to the frame 14 for transport or storage as shown in FIG. 11. The hand levers 44r, 44l, can also be folded down after releasing similar binder bolts 47r, 47l which attach the vertical rods 66r, 66l, to the hand lever cranks 46r, 46l (see FIG. 2).

Figure 12:
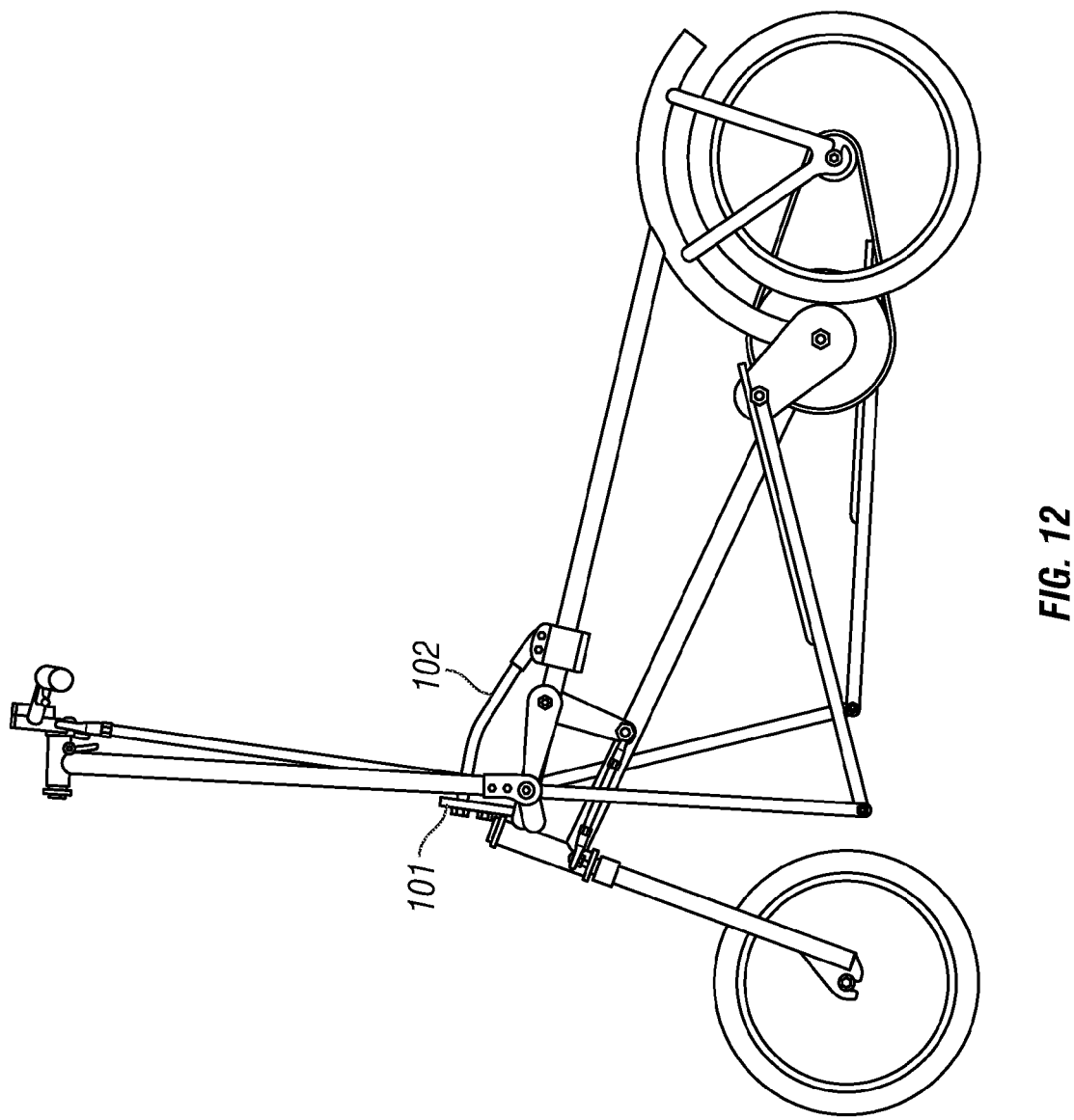
FIG. 12 is a side elevation view of the exercise vehicle with the upper arm portions attached firmly to each other and to the frame.

FIG. 12 shows a configuration in which the upper arm portions 38r, 38l are connected together in parallel and secured to the frame so that beginning riders can more easily learn to ride the vehicle. Cross plate 101 is attached to both upper plate 39*l* and 39*r* and to frame anchor 102, which is attached to the frame 14.

Those who are skilled in the art will appreciate and understand that modifications may be made to the described embodiments of the invented exercise vehicle 10 and steering system 12 without departing from the spirit and scope of the invention. For example, the exercise vehicle 10 may have two, three, four or more wheels. The exercise vehicle may have one or more drive wheel 18 or may have one or more guidance wheel 58. Also, the pedals 29*r*, 29*l* or foot platforms 28*r*, 28*l* may be replaced by foot rests so that the rider 30 propels the exercise vehicle 10 by back-and-forth arm motions only.

While cruising about in the exercise vehicle 10, the rider receives a full body aerobic exercise and maximizes the power and efficiency of the rider's arm and leg motions while maintaining balance and executing a turn of the vehicle.

INDUSTRIAL APPLICABILITY

The exercise vehicle 10 and steering system 12 for such a vehicle may be understood to provide a transportation and/or exercise vehicle for a person. Such a vehicle utilizes the full power potential of the human body by using the simultaneous motion of the arms and legs to produce motion of the vehicle. The exercise vehicle's system provides an easy and efficient system for steering such a vehicle.

The exercise vehicle provides both aerobic and muscle-building exercise. It also better utilizes the human body as an engine by simultaneously using the rider's upper and lower body muscles. The exercise vehicle combines the powerful push and pull motion of the arms with the simultaneous and synchronized pedaling, climbing, or elliptical motion of the legs, thereby producing good upper body anaerobic exercise and good stair-climbing type aerobic exercise. The exercise vehicle exercises the entire body, even when a relatively short distance is traveled and when such travel is accomplished at slower speeds. Full body exercise that is smooth and shock free with minimum impact stress exerted on the muscles and joints is possible using the exercise vehicle.

The steering system 12 of the exercise vehicle 10 does not interfere with propulsion and provides good vertical control of the frame 14 for balance. The rider 30 remains in an upright position while propelling the exercise vehicle 10, thereby enabling the rider 30 to better see the surroundings, including approaching obstacles, and to better be seen by others who might be on a converging path. Continuous power is applied smoothly to the drive wheel 18, so that when the legs are providing the least power during the cycle, the arms are providing maximum power and vice versa. Also, the exercise vehicle 10 may be readily folded and thus easily transported in an automobile.

What is claimed:

1. An exercise vehicle comprising:
a frame;
a drive system attached to said frame;
a front fork rotatively coupled on a steering axis to the frame;
a guidance wheel rotatively coupled to the front fork;
a steering crank coupled to the front fork so that the guidance wheel turns when the steering crank rotates on the steering axis;
left and right arm levers pivotally coupled to the frame on a center pivot axis and projecting generally upward from the frame;
left and right hand levers pivotally coupled respectively to upper arm portions of the left and right arm levers;
left and right vertical rods pivotally coupled respectively to the left and right hand levers, the vertical rods having lower vertical rod ends;
left and right horizontal rods pivotally coupled on a forward end of the horizontal rods respectively to a left and right side of the steering crank; and
left and right bell cranks pivotally coupled to the frame on a bell crank pivot axis, the bell cranks having horizontal bell crank ends and vertical bell crank ends, the vertical bell crank ends pivotally coupled with a respective rear end of the horizontal rods, the horizontal bell crank ends pivotally coupled respectively with the lower vertical rod ends, the bell cranks configured so that when pivoting about the bell crank pivot axis, the lower vertical rod ends pass at least near the center pivot axis.

2. The exercise vehicle of claim 1 wherein the steering crank, horizontal rods, bell cranks, vertical rods and hand levers are configured so that when a rider presses down on the left hand lever, the left hand lever pushes down the left vertical rod, which rotates the left bell crank, which pulls the left horizontal rod, which pulls a left side of the steering crank, causing the steering crank to turn the front fork and guidance wheel to the left.

3. The exercise vehicle of claim 1 wherein the steering crank, horizontal rods, bell cranks, vertical rods and hand levers are configured so that when a rider presses down on the right hand lever, the right hand lever pushes down the right vertical rod, which rotates the right bell crank, which pulls the right horizontal rod, which pulls a right side of the steering crank, causing the steering crank to turn the front fork and guidance wheel to the right.

4. The exercise vehicle of claim 1 wherein the drive system includes left and right pedal extensions pivotally coupled respectively to lower portions of the left and right arm levers, the left and right pedal extensions pivotally coupled respectively to left and right pedals.

5. The exercise vehicle of claim 1 wherein the drive system includes left and right foot platforms pivotally coupled respectively to lower portions of the left and right arm levers, the left and right foot platforms pivotally coupled respectively to left and right drive cranks.

6. The exercise vehicle of claim 1 wherein the bell cranks are configured so that when pivoting about the bell crank pivot axis, the lower vertical rod ends pass through the center pivot axis.

7. The exercise vehicle of claim 1 wherein the center pivot axis is generally horizontal and normal to a direction of travel of the exercise vehicle.

8. The exercise vehicle of claim 1 wherein the bell crank pivot axis is generally horizontal and normal to a direction of travel of the exercise vehicle.

9. The exercise vehicle of claim 1 wherein the left and right vertical rods are pivotally coupled respectively to the left and right hand levers through left and right hand lever cranks, respectively.

10. A steering system for an exercise vehicle comprising:
a steering crank configured to couple to a front fork rotatively coupled on a steering axis to a frame of the exercise vehicle, the front fork configured to hold a guidance wheel;
an arm lever pivotally coupled to the frame on a center pivot axis, the arm lever projecting generally upward from the frame;
a hand lever pivotally coupled to an upper arm portion of the arm lever;

a vertical rod pivotally coupled at an upper end to the hand lever, the vertical rod having a lower vertical rod end;
a horizontal rod pivotally coupled on a froward end to the steering crank;
a bell crank pivotally coupled to the frame on a bell crank pivot axis, the bell crank having a horizontal bell crank end and a vertical bell crank end, the vertical bell crank end pivotally coupled with a rear end of the horizontal rod, the horizontal bell crank end pivotally coupled with the lower vertical rod end, the bell crank configured so that when pivoting about the bell crank pivot axis, the lower vertical rod end passes at least near the center pivot axis; and
wherein the bell crank is configured so that when pivoting about the bell crank pivot axis, the lower vertical rod end passes through the center pivot axis.

11. An exercise vehicle comprising:
a frame;
a drive system attached to said frame;
a front fork rotatively coupled on a steering axis to the frame;
a guidance wheel rotatively coupled to the front fork;
a steering crank coupled to the front fork so that the guidance wheel turns when the steering crank rotates on the steering axis;
left and right arm levers pivotally coupled to the frame on a center pivot axis and projecting generally upward from the frame;
left and right hand levers pivotally coupled respectively to upper arm portions of the left and right arm levers;
left and right hand lever cranks rigidly coupled to the left and right hand levers respectively;
left and right vertical rods pivotally coupled respectively to the left and right hand lever cranks, the vertical rods having lower vertical rod ends;
left and right horizontal rods pivotally coupled on a forward end of the horizontal rods respectively to a left and right side of the steering crank; and
left and right bell cranks pivotally coupled to the frame on a bell crank pivot axis, the bell cranks having horizontal bell crank ends and vertical bell crank ends, the vertical bell crank ends pivotally coupled with a respective rear end of the horizontal rods, the horizontal bell crank ends pivotally coupled respectively with the lower vertical rod ends, the bell cranks configured so that when pivoting about the bell crank pivot axis, the lower vertical rod ends pass at least near the center pivot axis.

12. The exercise vehicle of claim 11 wherein the bell cranks are configured so that when pivoting about the bell crank pivot axis, the lower vertical rod ends pass through the center pivot axis.

13. The exercise vehicle of claim 11 wherein the steering crank, horizontal rods, bell cranks, vertical rods, hand lever cranks and hand levers are configured so that when a rider presses down on the right hand lever, the right hand lever crank pushes down the right vertical rod, which rotates the right bell crank, which pulls the right horizontal rod, which pulls a right side of the steering crank, causing the steering crank to turn the front fork and guidance wheel to the right.

14. The exercise vehicle of claim 11 wherein the drive system includes left and right pedals extensions pivotally coupled respectively to lower portions of the left and right arm levers, the left and right pedal extensions pivotally coupled respectively to left and right pedals.

15. The exercise vehicle of claim 11 wherein the drive system includes left and right foot platforms pivotally coupled respectively to lower portions of the left and right arm levers, the left and right foot platforms pivotally coupled respectively to left and right drive cranks.

16. An exercise vehicle comprising:
a frame;
a drive system attached to said frame;
a front fork rotatively coupled on a steering axis to the frame;
a guidance wheel rotatively coupled to the front fork;
a steering crank coupled to the front fork so that the guidance wheel turns when the steering crank rotates on the steering axis;
left and right arm levers pivotally coupled to the frame on a center pivot axis and projecting generally upward from the frame;
left and right hand levers pivotally coupled respectively to upper arm portions of the left and right arm levers;
left and right vertical rods pivotally coupled respectively to the left and right hand levers, the vertical rods having lower vertical rod ends;
left and right horizontal rods pivotally coupled on a forward end of the horizontal rods respectively to a left and right side of the steering crank; and
left and right bell cranks pivotally coupled to the frame on a bell crank pivot axis, the bell cranks having horizontal bell crank ends and vertical bell crank ends, the vertical bell crank ends pivotally coupled with a respective rear end of the horizontal rods, the horizontal bell crank ends pivotally coupled respectively with the lower vertical rod ends, the left and right bell cranks having left and right bell crank lines defined as running through the bell crank pivots and the lower vertical rod ends, the bell cranks configured such that when switching from a left turn steering position to a right turn steering position, the bell crank lines pass through the center pivot axis.

17. The exercise vehicle of claim 16 wherein the steering crank, horizontal rods, bell cranks, vertical rods and hand levers are configured so that when a rider presses down on the left hand lever, the left hand lever pushes down the left vertical rod, which rotates the left bell crank, which pulls the left horizontal rod, which pulls a left side of the steering crank, causing the steering crank to turn the front fork and guidance wheel to the left.

18. The exercise vehicle of claim 16 wherein the steering crank, horizontal rods, bell cranks, vertical rods and hand levers are configured so that when a rider presses down on the right hand lever, the right hand lever pushes down the right vertical rod, which rotates the right bell crank, which pulls the right horizontal rod, which pulls a right side of the steering crank, causing the steering crank to turn the front fork and guidance wheel to the right.

19. The exercise vehicle of claim 16 wherein the drive system includes left and right pedal extensions pivotally coupled respectively to lower portions of the left and right arm levers, the left and right pedal extensions pivotally coupled respectively to left and right pedals.

20. The exercise vehicle of claim 16 wherein the drive system includes left and right foot platforms pivotally coupled respectively to lower portions of the left and right arm levers, the left and right foot platforms pivotally coupled respectively to left and right drive cranks.

21. The exercise vehicle of claim 16 wherein the bell cranks configured so that when pivoting about the bell crank pivot axis, the lower vertical rod ends pass at least near the center pivot axis.

22. The exercise vehicle of claim 16 wherein the bell cranks are configured so that when pivoting about the bell crank pivot axis, the lower vertical rod ends pass through the center pivot axis.

23. The exercise vehicle of claim 16 wherein the center pivot axis is generally horizontal and normal to a direction of travel of the exercise vehicle.

24. The exercise vehicle of claim 16 wherein the bell crank pivot axis is generally horizontal and normal to a direction of travel of the exercise vehicle.

25. The exercise vehicle of claim 16 wherein the left and right vertical rods are pivotally coupled respectively to the left and right hand levers through left and right hand lever cranks, respectively.

* * * * *